United States Patent [19]

Jackson et al.

[11] Patent Number: 4,520,385

[45] Date of Patent: May 28, 1985

[54] TELEVISION TRANSMISSION SYSTEM

[75] Inventors: Richard N. Jackson, Horley, Great Britain; Sing L. Tan, Eindhoven, Netherlands

[73] Assignee: U.S. Philips Corporation, New York, N.Y.

[21] Appl. No.: 447,083

[22] Filed: Dec. 6, 1982

[30] Foreign Application Priority Data

Jun. 11, 1982 [GB] United Kingdom ............... 8217099

[51] Int. Cl.$^3$ .............................................. H04N 9/32
[52] U.S. Cl. ...................................... 358/12; 358/330
[58] Field of Search ................. 358/310, 330, 335, 12, 358/13, 14

[56] References Cited

U.S. PATENT DOCUMENTS 4,435,734  3/1984  Hedberg .............................. 358/330

FOREIGN PATENT DOCUMENTS 2908321  9/1980  Fed. Rep. of Germany ...... 350/330

Primary Examiner—Michael A. Masinick
Attorney, Agent, or Firm—Thomas A. Briody; William J. Streeter; Edward W. Goodman

[57] ABSTRACT

A high definition color television transmission system in which wide-band luminance information (Y, FIG. 1) is utilized to produce a first luminance information portion comprising lower frequency (0 to 3.8 MHz) and middle frequency (3.8 to 5.5 MHz) components and a second luminance information portion comprising the middle frequency (3.8 to 5.5 MHz) and upper frequency (5.5 to 8.8 MHz) components. The first luminance information portion (Y1, FIG. 2) is transmitted by way of a first transmission path together with a color subcarrier ($f_{sc}$) modulated by color information. The bandwidth of the color information is such that the modulation component lie substantially within the bandwidth of the middle frequency components. The second luminance information portion is frequency shifted to lie within 0 and 5 MHz (Y2, FIG. 3) and is transmitted by way of a second transmission path. The two transmissions may also carry separate sound signals ($f_{S1}$, FIG. 1, $f_{S2}$, FIG. 3). The two transmissions may be jointly received for the provision of a high definition display, however, the invention has the distinct advantage that the signal of the first transmission path may be received alone by currently manufactured television receivers for reproduction of a display of a quality which is accepted as normal.

14 Claims, 8 Drawing Figures

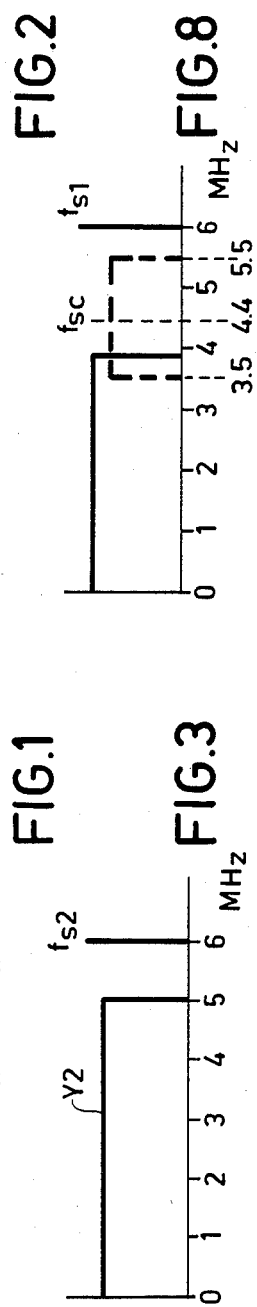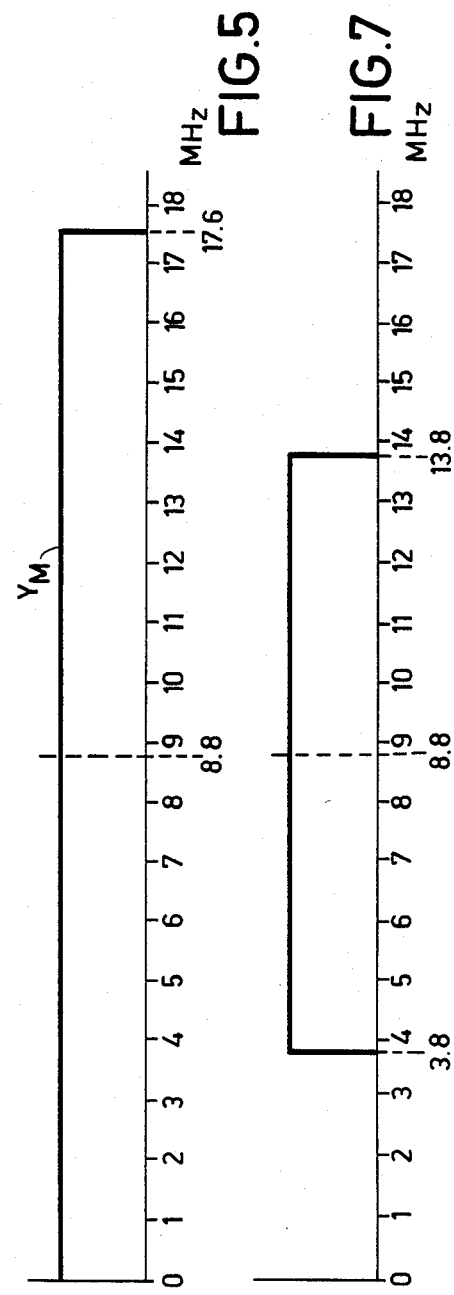

TELEVISION TRANSMISSION SYSTEM

BACKGROUND OF THE INVENTION

The invention relates to a high definition color television transmission system in which, from a wide band luminance information signal having lower, middle and upper frequency components, there are formed a first luminance portion containing the lower frequency components of said luminance information signal and a second luminance portion containing the higher frequency components of said luminance information signal, the first luminance portion being transmitted by way of a first transmission path and the said second luminance portion being frequency shifted such that the resulting frequency shifted second luminance portion lies within the bandwidth of a second transmission path which bandwidth is substantially equal to that of the first transmission path, the frequency shifted second luminance portion being transmitted by way of the second transmission path. The invention also relates to television transmission equipment and television reception equipment for use with such a transmission system.

Such a transmission system has been disclosed in the book "Video Tape Recording" by Julian L. Bernstein, published by Johm F. Rider Publisher, Inc. New York, where, in chapter 6, at page 94, it proposes to divide a television signal into four parts of equal bandwidth and to frequency shift (heterodyne) the three higher frequency parts into the same frequency band as that occupied by the lowest part. The television signal with which this disclosure is concerned is a narrow band signal of 4 MHz bandwidth and is divided and frequency shifted so that it can be recorded on four separate tracks of a tape recorder. It would appear that the television signal in question would be for monochrome display while from the tape speed, the four tracks would be recorded linearly along the tape. Since the publication of this book, considerable improvements have been made in video recording through video tape recorders for analog signals still have a restriction on the bandwidth (a few MHz's) that can be recorded.

The color television signal currently transmitted by the broadcast authorities in the United Kingdom, uses the PAL system with the transmissions taking place in the U-H.F. bands IV and V. In such transmissions the luminance information has a bandwidth of 5.5 MHz with a color subcarrier located at a point nominally 4.43 MHz above the carrier frequency, the color subcarrier being modulated by the color information. Substantially all of the currently manufactured color television receivers do not fully utilize all the luminance information transmitted. The luminance information above 3.5 MHz in a receiver is reduced in magnitude to simplify the operation of decoding the color information and with such simplified decoding, cross-luminance interference would be observed on the display without such reduction. Considerable interest has however been shown in increasing the quality of the display and this can be done by using the whole of the luminance information transmitted.

Various suggestions have been made to further increase the bandwidth, and hence the quality and definition, of transmitted color television signals. One such suggestion contemplates the transmission of a single sideband luminance modulated signal of 10 MHz bandwidth with the modulated color subcarrier being located in the other sideband. Such a transmission could not readily be currently transmitted in the U.H.F. bands IV or V as the required bandwidth would overlap into an adjacent channel. In addition, such a transmission could not be received by television receivers currently manufactured and would thus be only receivable by specially constructed receivers. A further suggestion proposed by NHK (Japan Broadcasting Corporation) in their NHK Laboratories Note, Ser. No. 239, August 1979 contemplates the separate transmission of luminance and color information in separate channels and suffers from similar objections to those above. Yet a further suggestion comes from the BBC (British Broadcasting Corporation) in their Engineering Press Release "The BBC moves towards better quality pictures", dated Feb. 23, 1982, where for wide-band transmissions such as those via satellite or optical fiber cable, it is suggested that the high frequency luminance information above 3.5 MHz be filtered off and this higher frequency information frequency shifted upwards to a higher band (8 MHz upwards) and transmitted together with the original low frequency information and chrominance signals. Such a system cannot be used with current channel spacing in the U.H.F. bands IV and V and, although the low frequency luminance information and chrominance signals could be used to provide a reasonable display in most currently manufactured color television receivers, any receiver designed to utilize the full 5.5 MHz luminance bandwidth would produce a display that is impaired by the signal of this suggestion.

SUMMARY OF THE INVENTION

It is an object of the present invention to provide a high definition color television transmission system which, besides being capable of being received by high quality reception equipment, can also be received by currently manufactured color television receivers while the system can be transmitted over transmission paths of narrower bandwidth than that of the wide-band luminance signal.

The invention provides a high definition color television transmission system in which, from a wide-band luminance information signal having lower, middle and upper frequency components, there are formed a first luminance portion containing the lower frequency components of said luminance information signal and a second luminance portion containing the higher frequency components of said luminance information signal, the first luminance portion being transmitted by way of a first transmission path and the said second luminance portion being frequency shifted such that the resulting frequency shifted second luminance portion lies within the bandwidth of a second transmission path, which bandwidth is substantially equal to that of the first transmission path, the frequency shifted second luminance portion being transmitted by way of the second transmission path, characterized in that both said first and second luminance portions additionally contain the middle frequency components of said luminance information signal such that said middle frequency components are transmitted by both said first and second transmission paths, a color subcarrier modulated by color information also being transmitted by way of said first transmission path which modulated subcarrier is located substantially within the frequency spectrum occupied by said middle frequency components, the system being such that the transmission from the first and second transmission paths may be received together and the first and second luminance portions of the luminance information recombined for reproduction as a high definition color television display, or the transmission from the first transmission path may be received alone for reproduction as a color television display of normal quality as herein defined.

By the expression "a color television picture of normal quality" we mean one which is comparable with the quality as produced by the average domestic color television receiver as presently available of a corresponding display screen size when viewed at a typical viewing distance appropriate to the screen size.

The lower and upper frequency components may be of substantially the same bandwidth while the middle frequency components may be of substantially half the bandwidth of that of said lower and upper frequency components.

The frequency shifted second luminance portion may be frequency inverted with respect to the second luminance portion.

The transmission by way of said first transmission path may contain periodic bursts at the frequency of the color subcarrier while the transmission by way of the second transmission path may also contain similar bursts having the same phase as those in the first transmission path.

The transmission paths may comprise synchronized respective first and second radio frequency television transmission channels having different carrier frequencies. Alternatively, the first and second transmission paths may be the record/reproduce channels of video recording apparatus. Where the first and second transmission paths are the record/reproduce channels of separate video tape recorders, these recorders may be controlled to ensure synchronization therebetween by means of the periodic bursts at the frequency of the color subcarrier in the transmissions of the first and second transmission paths.

The invention also provides television transmission equipment for use with the above high definition television transmission system comprising means for providing wide-band luminance information, means for filtering said first luminance portion containing the lower and middle frequency components from said luminance information, means for adding the color subcarrier modulated by color information, to said first luminance portion, means for applying the combined first luminance portion and modulated color subcarrier to said first transmission path, means for frequency shifting said second luminance portion containing the middle and upper frequency components of said luminance information to produce the frequency shifted second luminance portion which lies within the bandwidth of said second transmission path, and means for applying said frequency shifted second luminance portion to said second transmission path. Where the frequency shifted second luminance portion is frequency inverted with respect to the second luminance portion, the means for frequency shifting said second luminance portion may comprise means for applying said wide-band luminance information to a first low-pass filter having a cut-off frequency at or below twice the frequency of said color subcarrier, means for applying said filtered luminance information to a mixer stage, means for applying a signal of twice the frequency of said color subcarrier to said mixer stage, and means for applying the resulting heterodyned signal to a second low-pass filter having a cut-off frequency substantially equal to the sum of the bandwidth covering the lower and middle frequency components.

The invention further provides television reception equipment for use with the above high definition color television transmission system comprising means for receiving the transmission by way of the first transmission path and for producing therefrom the first luminance portion containing the lower and middle frequency components of said luminance information signal and said color information modulated subcarrier, means for receiving the transmission by way of the second transmission path and for producing therefrom the frequency shifted second luminance portion, means for producing from the frequency shifted second luminance portion, said second luminance portion containing the middle and upper frequency components of said luminance information, and means for combining said lower, middle and upper frequency components to reform said wide-band luminance information signal and for separately providing said color information signal. Where the frequency shifted second luminance portion is frequency inverted with respect to the second luminance portion, the means for producing said second luminance portion from said frequency shifted second luminance portion comprises means for applying said frequency shifted second luminance portion to a mixer stage, means for applying a signal of twice the frequency of said colour subcarrier to said mixer stage, and means for applying the resulting heterodyned signal to a low-pass filter having a cut-off frequency at or below twice the frequency of said color subcarrier.

Such equipment may additionally comprise means for applying the second luminance portion to a band-pass filter having a pass-band corresponding to that of said middle frequency components, means for subtracting the output of said band-pass filter from the first luminance portion to produce the lower frequency components of said luminance information signal and the color information modulated subcarrier substantially separated in frequency, and means for adding the lower frequency components from the first luminance portion to the middle and upper frequency components from the second luminance portion to produce the reformed wide band luminance information signal

DESCRIPTION OF THE DRAWINGS

The above and other features of the invention will be more readily understood from the following description, by way of example, having reference to the accompanying drawings in which:

FIG. 1 is a graph of a wide-band luminance information signal,

FIGS. 2 and 3 are graphs of the components of a color television transmission system according to the invention, FIG. 5 is a graph for explaining the operation of the transmission equipment of FIG. 4, FIGS. 7 and 8 are graphs for explaining the operation of the reception equipment of FIG. 6.

DESCRIPTION OF THE PREFERRED EMBODIMENT

Figure 6:
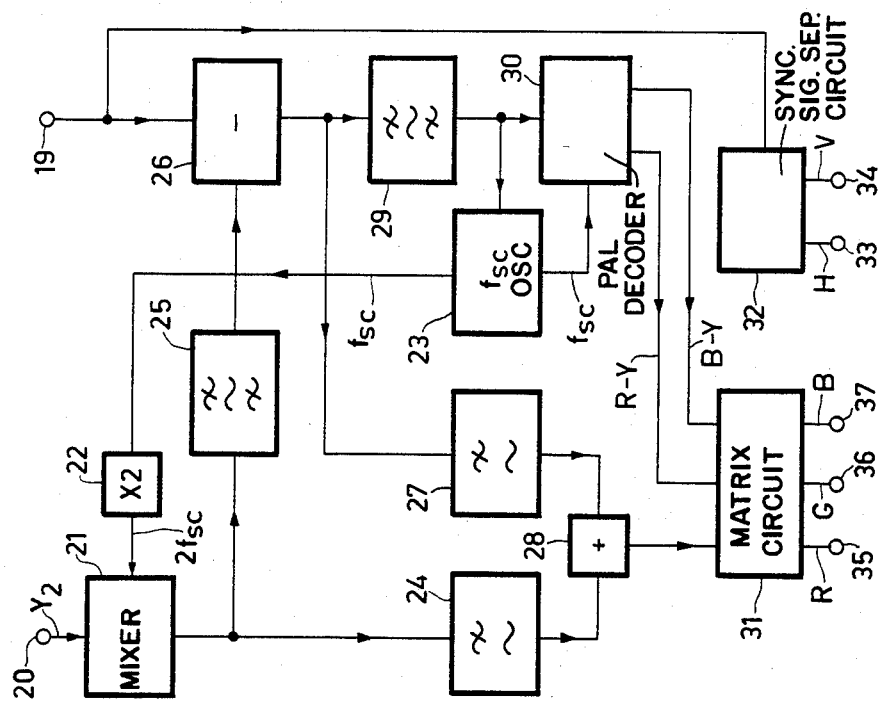
FIG. 6 is a block diagram of television reception equipment according to the invention.

In FIG. 1 there is shown in idealized form the frequency characteristic of a wide-band luminance information signal Y for a high definition television system. As will be seen from this Figure, the bandwidth of the luminance information signal Y is 8.8 MHz which is over 3 MHz wider than that transmitted with color television signals in the United Kingdom and most other countries and more than twice the bandwidth of the luminance information normally utilized in the majority of currently manufactured color television receivers. It is considered that a bandwidth of 8.8 MHz is sufficient to give a marked improvement in the quality of a display obtained from the information and is sufficiently improved for it to be termed high definition in contrast with displays obtained with current television receivers. The choice of 8.8 MHz (nominal) for the bandwidth is by way of example only, but such a frequency has advantages in the manufacture and operation of transmission and reception equipment as will become apparent from the description below of such equipment. For the purposes of explanation, the luminance information signal Y is considered to be divided into three regions which respectively comprise the lower frequency components $Y_L$ between 0 and 3.8 MHz, the middle frequency components $Y_M$ between 3.8 and 5.5 MHz and the upper frequency components $Y_U$ between 5.5 and 8.8 MHz. A colour television signal including a luminance information signal of the above bandwidth could not, however, be transmitted in the existing broadcast transmission channels of the U.H.F. bands IV and V in the United Kingdom or the appropriate braodcast transmission channels used elsewhere, as such a signal would occupy a bandwidth greater than that allocated to such channels. For the same reason of restricted bandwidth, it would not be possible to transmit such a wide-band luminance information signal via existing cables used for cable television transmission nor via satellite broadcasting channels as proprosed by the 1977 Geneva World Broadcasting Satellite Administration Radio Conference (WARC 77) in their plan for direct broadcast satellite modulation systems. It would also not be possible to record such a signal on most analog video tape recorders as such recorder are not able to cope with such a large bandwidth.

With the present invention, the luminance information signal Y is effectively used to form two portions, each of which may be transmitted within the bandwidth of the existing channels of the U.H.F. bands IV and V or other transmission channels or may be recorded within the bandwidth of most analog video tape recorders. The first luminance portion contains the lower and middle frequency components, i.e. those up to 5.5 MHz, which is transmitted over a first transmission path, such as a transmitted television channel or on a video tape recorder, and the bandwidth of this first luminance portion is shown as Y1 in FIG. 2. FIG. 2 also shows that the color information signal is transmitted with the first luminance portion on a color subcarrier $f_{sc}$ which is at the usual nominal frequency of 4.4 MHz, the modulation of the color information extending above and below the subcarrier by approximately 1 MHz as per the system-I transmissions in the United Kingdom (see "Specification of television standards for 625-line system-I transmissions" published jointly by the British Broadcasting Corporation and the Independent Television Authority, January 1971, page 10, FIG. 8).

The color information signal substantially lies between 3.5 and 5.5 MHz and is substantially contained within the spectrum occupied by the middle frequency components of the luminance information signal. For the United Kingdom and those countries using the PAL color television system, the method of modulating the color information would be as per that system, but in countries using other systems such as N.T.S.C. or S.E.C.A.M., then the method of modulation would be as per those other systems. FIG. 2 also shows that in the broadcast application a sound carrier $f_{S1}$ is transmitted at 6 MHz in the normal manner which in the United Kingdom would be frequency modulated, but in other countries this sound carrier would be at an appropriate different frequency such as 5.5 MHz. The second portion contains the middle and upper frequency components i.e. those between 3.8 and 8.8 MHz, and is frequency shifted such that this upper 5 MHz band is frequency shifted to occupy a bandwidth of 0-5 MHz for transmission over a second transmission path, the bandwidth thereof being substantially the same as that for the transmission over the first path. Such a signal is shown in FIG. 3 at Y2 which Figure also shows for the broadcast application the transmission of a second sound channel $f_{S2}$ also located at the 6 MHz point and modulated in the same manner as before. When the transmission paths are video tape recorders, the sound signals S1 and S2 would be recorded on separate tape tracks in the usual manner. In this way, the two transmissions may provide two sound signals either for stereo or bi-lingual reception. Although not shown in FIG. 3, the transmission over the second path may also contain periodic bursts at the color subcarrier frequency having the same phase as those which will be transmitted over the first transmission path and which may be used for synchronizing purposes in a receiver as will be hereinafter described. The transmission over the second transmission path does not, however, contain color information modulation. The luminance portion Y2 shown in FIG. 3 may be frequency inverted with respect to the portion contained above 3.8 MHz as shown in FIG. 1.

By dividing the luminance information for transmission by way of two transmission paths in the manner described above, the advantage is obtained that both transmissions may be received together and the resulting portions of the luminance information added together, following the necessary processing, to reform the wide-band luminance information. In addition the middle frequency components between 3.8 and 5.5 MHz of the wide-band luminance information signal is transmitted by both the first and second transmission paths whereas the color information is transmitted by only the first transmission path. This can be used in a receiver to be described hereinafter whose diplay will be substantially free from cross-luminance and cross-colour interference. The system however, has a particular additional advantage in that it is compatible with current colour television transmissions in that one of the transmissions, namely that shown in FIG. 2, may be received and displayed on a colour television of current manufacture and thus the transmission of FIG. 2 would produce a display of a quality corresponding to that currently produced by such receivers. The transmission of FIG. 2 will also be fully used in more complex receivers which will embody means for cross-color and cross-luminance reduction when utilising the full 5.5 MHz luminance information when such receivers become available.

Figure 4:
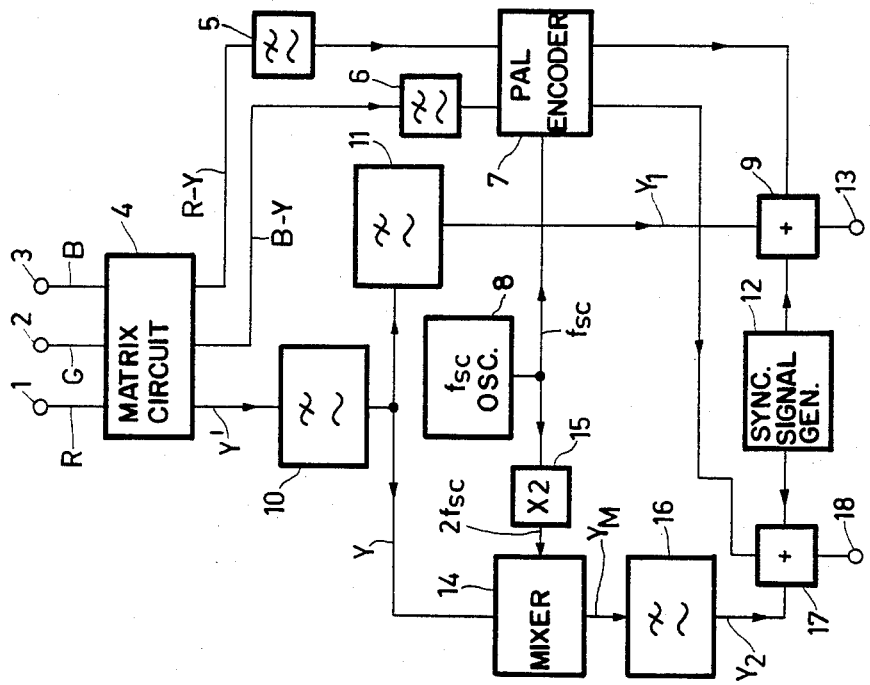
FIG. 4 is a block diagram of television transmission equipment according to the invention.

FIG. 4 shows a block diagram of television transmission equipment for use with the present transmission system. In FIG. 4 terminals 1, 2 and 3, respectively, receive red (R), green (G) and blue (B) color signals such as those produced by a high definition color television camera. These color signals are applied to a matrix circuit 4 which produces three outputs the first of which is a luminance signal Y' while the remaining two are, respectively, color difference signals R-Y and B-Y. The color difference signals R-Y and B-Y are applied through respective low-pass filters 5 and 6 of appropriate cut-off frequencies to a PAL encoder circuit 7 to which oscillations at the color subcarrier frequency $f_{sc}$ (nominally 4.4 MHz) are applied from an oscillation generator 8, and this resulting color subcarrier modulated by the color difference signals is applied from an output of the PAL encoder circuit 7 together with the color burst to the first input of an adder circuit 9. The luminance signal Y' from the matrix circuit 4 may have a bandwidth greater than 8.8 MHz and so this luminance signal is applied through a low-pass filter 10 having a cut-off frequency of 8.8 MHz and the resulting signal is the wide-band luminance information signal Y as shown in FIG. 1. The signal Y is applied through a second low-pass filter 11 which has a cut-off frequency of 5.5 MHz to produce the first portion of the luminance information signal Y1 comprising the lower and middle frequency components shown in FIG. 2, this first portion being applied to the second input of the adder circuit 9. The other input of the adder circuit 9 receives line and field synchronizing signals from a generator 12 and the output of the adder circuit 9 produces a composite television signal which includes the luminance and modulated color information portions as shown in FIG. 2, this being applied to a terminal 13 for transmission by way of a first transmission path.

The wide-band luminance information signal Y is also applied to a mixer circuit 14 which receives at a second input a signal of twice the frequency of the color subcarrier, that is at a (nominal) frequency of 8.8 MHz, from a frequency multiplier circuit 15 which itself receives a signal at the color subcarrier frequency $f_{sc}$ from the oscillation generator 8. The mixer circuit 14 produces an 8.8 MHz carrier about which is modulated the wide-band luminance information, the resulting signal $Y_M$ being shown in FIG. 5 and from this Figure it will be appreciated that in the lower sideband frequency inversion has taken place. The modulated signal $Y_M$ is applied to a low pass filter 16 having a cut-off frequency of 5 MHz to produce at its output the signal Y2 shown in FIG. 3 where the signal at zero frequency represents the luminance component at 8.8 MHz of the information shown in FIG. 1 while that at 5 MHz represents the component at 3.8 MHz, this signal comprising the middle and upper frequency components of the luminance information signal Y. The output of the low-pass filter 16 (to which the required d.c. component is added) is applied to a first input of a second adder circuit 17 a second input of which receives the line and field synchronizing signals from the generator 12. A third input of the adder circuit 17 receives the color burst of color subcarrier frequency $f_{sc}$ from a second output of the PAL encoder circuit 7 in the same phase as that applied to adder circuit 9, for synchronization purposes. The output of the adder circuit 17 is a composite television signal including the second luminance information portion Y2, this being applied to a terminal 18 for transmission by way of a second transmission path.

From FIG. 4 it will be appreciated why the frequency of 8.8 MHz has been chosen for the bandwidth of the wide-band luminance information signal as this frequency is twice that of the colour subcarrier which makes it convenient to use this frequency as the carrier for the modulated signal from the mixer circuit 14 which at the same time, places a limit on the bandwidth.

FIG. 6 shows an embodiment of television reception equipment for the reception of signals transmitted by the transmission equipment of FIG. 4. The reception equipment of FIG. 6 has two inputs 19 and 20 which, respectively, receive over separate transmission paths the signals present at terminals 13 and 18, respectively. As explained with reference to FIG. 4, both of these signals contain the burst at color subcarrier frequency and this together with the line and field synchronizing signals may be used to ensure accurate synchronization between the two signals appearing at terminals 19 and 20. This may be achieved using known techniques and it is assumed that the signals at these terminals have such synchronization.

The signal received at terminal 20 is the signal of FIG. 3 which is applied to a first input of a mixer circuit 21, a second input of which receives a signal $2f_{sc}$ at twice the frequency of the subcarrier from a frequency multiplier circuit 22 which itself receives as its input the signal $f_{sc}$ from a subcarrier regenerative oscillator 23. The output of the mixer circuit 21 is the signal Y2 modulated on a carrier to twice the frequency of the subcarrier, this output being shown in FIG. 7 from which it will be seen that the portion of the Y2 signal transmitted between 0 and 5 MHz is frequency converted to lie as a lower side-band between 3.8 MHz and 8.8 MHz and an upper side-band which lies between 8.8 MHz and 13.8 MHz. This signal is applied to a low-pass filter 24 having a cut-off frequency at 8.8 MHz such that at its output is the middle and higher frequency components of the wide-band luminance signal Y, namely those shown above 3.8 MHz in FIG. 1. The output of mixer circuit 21 is also applied to a band-pass filter 25 having cut-off frequencies such that its output is the middle frequency components of the wide band signal i.e. those located between 3.8 and 5.5 MHz. This part of the output of the mixer circuit 21 corresponds to the middle frequency components present in the first portion Y1 of the luminance information signal which shares the same part of the frequency spectrum as the color information signals when modulated on the color subcarrier. The output from the band-pass filter 25 is applied to a first input of a subtractor circuit 26, a second input of which receives the signal of FIG. 2 present at terminal 19. The output of this subtractor circuit 26 consists of a signal in which the luminance and colour information signals are substantially separated in frequency, those components of the spectrum between 0 and 3.5 MHz being substantially luminance only while those between 3.8 and 5.5 MHz are substantially colour information only as shown in FIG. 8, with a small overlap between 3.5 and 3.8 MHz.

The output from the subtractor circuit 26 is applied to a low-pass filter 27 having a cut-off frequency of 3.8 MHz such that its output contains the low frequency components of the luminance information signal which components are applied to a first input of an adding circuit 28. The output of subtractor circuit 26 is also applied to a band-pass filter 29 having a passband between the frequencies 3.5 and 5.5 MHz and which thus produces at its output the modulated color subcarrier which is applied to a first input of a PAL decoder circuit 30. This signal from filter 29 is also applied to the subcarrier regenerative oscillator 23 which produces oscillations at the subcarrier frequency $f_{sc}$ for application to a second input of the PAL decoder circuit 30. The PAL decoder circuit produces two outputs which respectively convey the color difference signals R-Y and B-Y, which signals are applied to respective first and second inputs of a matrix circuit 31. The input at terminal 19 is also applied to a sync. separator circuit 32 which produces separated line (H) and field (V) synchronizing signals which are shown applied to terminals 33 and 34 for use in the production of the display in the usual manner.

The output from the band-pass filter 24 is applied to a second input of the adder 28, the output of which is the reconstituted wide-band luminance information signal Y of FIG. 1 and which is applied to a third input of the matrix circuit 31. The matrix circuit operates on the wide-band luminance information signal Y and the color difference signals R-Y and B-Y to produce at respective output terminals 35, 36 and 37, color signals R, G and B. These color signals may then be applied to a high definition display tube to produce a high quality color television display.

The characteristics with frequency of the accompanying graphs are in fact idealized and in practice perfect cut-offs at the frequencies shown would not be achieved. The small amount of color information signal present in the luminance information signal just below 3.8 MHz in FIG. 8 would only produce a very small amount of cross-color degradation. The major reduction in cross-color and cross-luminance achieves results from the substantial elimination of the luminance information signal close to the frequency of the colour subcarrier.

In the above description of transmission and reception equipment no reference has been made to the way in which the sound signals S1 and S2 are added to or derived from the transmissions. This however, may be in known manner using known techniques.

What is claimed is:

1. A method of transmitting a high definition color television signal including a wide-band luminance information signal having lower, middle and upper frequency components, said method comprising the steps: forming a first luminance portion containing the lower frequency components of said luminance information signal; forming a second luminance portion containing the higher frequency components of said luminance information signal; transmitting said first luminance portion by way of a first transmission path; frequency shifting said second luminance portion such that the resulting frequency shifted second luminance portion lies within the bandwidth of a second transmission path, which band width is substantially equal to that of the first transmission path; and transmitting the frequency shifted second luminance portion by way of the second transmission path, characterized in that both said first and second luminance portions additionally contain the middle frequency components of said luminance information signal such that said middle frequency components are transmitted by both said first and second transmission paths; and said method further comprises transmitting a color subcarrier modulated by color information by way of said first transmission path which modulated subcarrier is located substantially within the frequency spectrum occupied by said middle frequency components, whereby the transmissions from the first and second transmission paths may be received together and the first and second luminance portions of the luminance information recombined for re-production as a high definition color television display or the transmission from the first transmission path may be received alone for reproduction as a color television display of normal quality.

2. A method of transmitting a high definition color television signal as claimed in claim 1, characterized in that said lower and upper frequency components are of substantially the same bandwidth while said middle frequency components are of substantially half the bandwidth of that of said lower and upper frequency components.

3. A method of transmitting a high definition color television signal as claimed in claim 1, characterized in that the method further comprises frequency inverting the frequency shifted second luminance portion with respect to said second luminance portion.

4. A method of transmitting a high definition color television signal as claimed in claim 1, characterized in that the method further comprises transmitting, by way of said first transmission path, periodic bursts at the frequency of the color subcarrier, and transmitting, by way of said second transmission path, periodic bursts at the frequency of the color subcarrier, which bursts have the same phase as said bursts in said first transmission path.

5. A method of transmitting a high definition color television signal as claimed in claim 4, characterized in that said first and second transmission paths comprise respective first and second radio frequency television channels having different carrier frequencies.

6. A method of transmitting a high definition color television signal as claimed in claim 5, in which said first and second transmission paths are the record/reproduce channels of separate video tape recorders, characterized in that said method comprises synchronizing said recorders by means of the periodic bursts at the frequency of said color subcarrier in the transmissions of said first and second transmission paths.

7. A method of transmitting a high definition color television signal as claimed in claim 1, characterized in that said first and second transmission paths are the record/reproduce channels of video recording apparatus.

8. A method of transmitting a high definition color television signal as claimed in claim 1, characterized in that said first and second transmission paths comprise respective first and second radio frequency television channels having different carrier frequencies.

9. Television transmission equipment for use in a high definition color television system comprising means for providing a wide-band luminance information signal containing lower, middle and upper frequency components, means for forming a first luminance portion from the lower and middle frequency components of said wide-band luminance information signal, means for forming a second luminance portion from the middle and upper frequency components of said wide-band luminance information signal, means for adding a color subcarrier, modulated by color information, to said first luminance portion, means for applying the combined first luminance portion and modulated color subcarrier to a first transmission path, means for frequency shifting said second luminance portion to produce a frequency shifted second luminance portion which lies within the bandwidth of a second transmission path, and means for applying said frequency shifted second luminance portion to said second transmission path.

10. Television reception equipment for use with television transmission equipment as claimed in claim 9, comprising means for receiving the transmission by way of the first transmission path and for producing therefrom the first luminance portion containing the lower and middle frequency components of said luminance information signal and said color information modulated subcarrier, characterized in that said equipment additionally comprises means for receiving the transmission by way of the second transmission path and for producing therefrom the frequency shifted second luminance portion, means for producing, from the frequency shifted second luminance portion, said second luminance portion containing the middle and upper frequency components of said luminance information signal, and means for combining said lower, middle and upper frequency components to reform said wide-band luminance information signal and for separately providing said color information signal.

11. Television reception equipment as claimed in claim 10, wherein said frequency shifted second luminance portion, produced from the transmission in said second transmission path, is frequency inverted relative to the second luminance portion, characterized in that said means for producing said second luminance portion from said frequency shifted second luminance portion comprises means for generating a signal of twice the frequency of said color subcarrier, a mixer to which said frequency shifted second luminance portion and said signal are applied, and a low-pass filter, having a cut-off frequency at or below twice the frequency of said color subcarrier, coupled to an output of said mixer.

12. Television reception equipment as claimed in claim 11, characterized in that said equipment additionally comprises a band-pass filter, having a pass-band corresponding to that of said middle frequency components, to which said second luminance portion is applied, means for subtracting the output of said band-pass filter from the first luminance portion to produce the lower frequency components of said luminance information signal and the color information modulated subcarrier substantially separated in frequency, and means for adding the lower frequency components, from said subtracting means, to the middle and upper frequency components of said second luminance portion to reform the wide-band luminance information signal.

13. Television transmission equipment as claimed in claim 9, characterized in that said frequency shifted second luminance portion is inverted relative to said second luminance portion.

14. Television transmission equipment as claimed in claim 13, characterized in that said means for forming and frequency shifting said second luminance portion comprises a first low-pass filter, having a cut-off frequency at or below twice the frequency of said color subcarrier, to which said wide-band luminance information signal is applied, means for generating a signal of twice the frequency of said color subcarrier, a mixer to which an output of said first low-pass filter and said signal generating means are applied, and a second low-pass filter, having a cut-off frequency substantially equal to the sum of the bandwidths of the lower and middle frequency components, coupled to an output of said mixer.

* * * * *